(12) United States Patent
Ichikawa et al.

(10) Patent No.: US 6,598,415 B2
(45) Date of Patent: Jul. 29, 2003

(54) ABSORPTION TYPE COOLING AND HEATING APPARATUS

(75) Inventors: Kazuma Ichikawa, Saitama (JP); Gou Mutou, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 10/053,574

(22) Filed: Jan. 24, 2002

(65) Prior Publication Data

US 2002/0108390 A1 Aug. 15, 2002

(30) Foreign Application Priority Data

Feb. 14, 2001 (JP) .................... P2001-036684

(51) Int. Cl.⁷ .................................. F25B 15/00
(52) U.S. Cl. ...................... 62/324.2; 62/476
(58) Field of Search ................ 62/324.2, 476, 62/495, 497, 489, 101

(56) References Cited

U.S. PATENT DOCUMENTS

| | | |
|---|---|---|
| 3,038,487 A | 6/1962 | Gardner |
| 4,394,959 A | 7/1983 | de Vries |
| 4,593,531 A | 6/1986 | Fujimoto |
| 5,901,567 A | 5/1999 | Suzuki et al. |
| 5,927,086 A * | 7/1999 | Suzuki et al. .................. 62/141 |
| 6,247,331 B1 * | 6/2001 | Nishiguchi et al. ........... 62/476 |
| 6,487,874 B2 * | 12/2002 | Yamazaki et al. ............ 62/476 |

FOREIGN PATENT DOCUMENTS

| | | | |
|---|---|---|---|
| EP | 0849548 A2 | 6/1998 | |
| JP | 405052439 A * | 3/1993 | .............. 62/324.2 |
| JP | 6-97127 | 11/1994 | |
| JP | 9-318183 | 12/1997 | |
| JP | 10-185344 | 7/1998 | |
| JP | 10-197008 | 7/1998 | |
| JP | 10-267448 | 10/1998 | |

* cited by examiner

Primary Examiner—Melvin Jones
(74) Attorney, Agent, or Firm—Armstrong, Westerman & Hattori, LLP.

(57) ABSTRACT

There are provided a conduit 9b for transferring a refrigerant to the evaporator 9, a conduit 7b for transferring an absorbent solution to the regenerator 3, and a branch conduit 9a. A check valve 17 is provided for communicating the branch conduit 9a to the conduit 7b. A check valve V3 is provided for allowing the flow from the absorber 2 to the regenerator 3. The valve 17 and the valve V3 are communicated at downstream side to each other. Those check valves maybe assembled in a single unit where a valve is arranged of a (free) ball shape and can be shifted by a pressure difference to switches each valve port, acting as a three-way valve. At the start-up or full condensation mode, the check valve 17 remains open while the check valve V3 is closed. This permits the refrigerant to flow from the condenser 9 via the branch conduit 9a to the regenerator 3.

3 Claims, 2 Drawing Sheets

ABSORPTION TYPE COOLING AND HEATING APPARATUS

BACKGROUND OF THE INVENTION

1. Field of the Invention

The present invention relates to an absorption type cooling and heating apparatus for operating in three different modes: cooling operation, heat-pump heating operation, and direct-burner or direct flame heating operation, and particularly to an absorption type cooling and heating apparatus arranged in which a cooling operation and a heat-pump operation are carried out at optimum conditions and can readily be switched to a direct-burner heating operation.

2. Description of the Related Art

There has been increased the demand of an absorption type cooling and heating apparatus which can carry out a heat-pump heating operation with the use of heat pumped up by an absorber in addition to a cooling operation. Such a heat-pump heating may however be declined in the efficiency of pumping up an energy of heat as the ambient temperature drops down. For compensation, an improvement is disclosed in Japanese Patent Publication (Heisei) 6-97127 where if the ambient temperature is too low, the heat-pump heating operation is replaced with a direct-burner heating operation.

We, the applicants, have developed an absorption type cooling and heating apparatus which can easily switch between a cooling operation, a heat-pump heating operation, and a direct-burner heating operation as is disclosed in Japanese Patent Laid-open Publication (Heisei) 10-197008. Our reference cooling and heating apparatus has a closed circulation loop where, when heat-pump heating operation fails to generate a required power of heating, a refrigerant in vapor heated to a high temperature by a regenerator is transferred to a condenser where it comes into contact with a cooling water conduit and is thus condensed before returned back to the regenerator. This allows the refrigerant vapor extracted from the regenerator to be fully condensed by the condenser but not circulated from the condenser to an evaporator, thus shifting from the heat-pump heating operation to the direct-burner heating operation.

Also, we have developed another absorption type cooling and heating apparatus which has a dedicated circulation path for permitting the refrigerant to spontaneously drop down from a condenser to a rectifier thus to circulate from the condenser via the rectifier to a regenerator as disclosed in Japanese Patent Laid-open Publication (Heisei) 10-267448.

The absorption type cooling and heating apparatus with the dedicated circulation path however needs an extra conduit of the dedicated circulation path for circulating the refrigerant, hence increasing the number of joints. This is unfavorable for generating a degree of vacuum in the system of the apparatus. The apparatus may be modified with a bypass where the refrigerant over-flown from the condenser is directly returned back to the top portion of the rectifier. It is yet necessary for inhibiting overflow in the other operation mode than the direct-burner heating operation to save a more amount of the refrigerant in the condenser. As a result, the duration of time from the initiation of the direct-burner heating operation to the start of overflow will be extended thus creating substantially a time delay before starting the direct-burner heating operation. As the refrigerant remaining in the condenser stays out of the actual operation, the energy spent for saving the refrigerant prior to the overflow will be wasted.

Also, the refrigerant remains at a considerable amount in the condenser at the start-up and will not move into the evaporator before a substantial difference in the pressure is developed. Therefore, the solution circulated from the absorber to the regenerator becomes highly dense and its density may be too high in the regenerator. This results in a less-vapor state in the regenerator. It is hence needed for preparing an excess amount of the refrigerant in the evaporator at the start-up to feed a redundancy of the refrigerant into the evaporator.

SUMMARY OF THE INVENTION

It is an object of the present invention to provide an absorption type cooling and heating apparatus which carries out a cooling operation or a heat-pump heating operation at optimum conditions and when needed, readily switch the operation mode into a direct-burner heating operation while eliminating the foregoing drawbacks.

Present invention having the first feature comprising an evaporator for holding a refrigerant, an absorber for allowing an absorbent solution to absorb a refrigerant vapor generated in the evaporator, a regenerator for recovering the density of an absorbent in the absorbent solution by heating up to extract the refrigerant vapor from the absorbent solution, a refrigerant vapor passage for transferring the refrigerant vapor from the regenerator to a condenser, and the condenser for condensing the refrigerant vapor which is returned back to the evaporator, where in a cooling operation, a heat-pump heating operation, and a direct-burner heating operation can be performed selectively, said absorption type cooling and heating apparatus comprising, a first conduit for transferring the condensed refrigerant generated in the condenser to the evaporator, a second conduit for transferring the absorbent solution from the absorber to the regenerator, a branch conduit branched from the first conduit, and a switching device for selectively communicating the branch conduit to the second conduit.

According to the first feature of the present invention, the communication between the branch conduit and the second conduit by the action of the switching device allows the refrigerant to flow from the condenser via the branch conduit and the second conduit to the regenerator. When the branch conduit and the second conduit are disconnected from each, the refrigerant is transferred via the first conduit to the evaporator.

Present invention having the second feature in which the switching device is a first check valve for allowing the flow from the condenser via the branch conduit to the regenerator while a second check valve is also provided for allowing the flow from the absorber to the regenerator, the first and second check valve communicated with each other at the downstream side.

According to the second feature of the present invention, at the start-up mode or the direct-burner heating operation mode where the pressure is lower at the absorber side than at the condenser side, the second check valve is closed to inhibit the flow of the solution from the absorber to the regenerator. On the other hand, at the heat-pump heating operation mode where the pressure is higher at the absorber side than at the condenser side, the first check valve is closed to inhibit the flow of the refrigerant from the condenser to the regenerator.

Present invention having the third feature in which the first and second check valves are assembled in a single unit having a movable valve portion provided at the downstream junction thereof so that the valve portion can be shifted to each end of its movement by a pressure difference between two fluids introduced into the input ports of the first and second check valves, thus the first check valve is shut up when the valve portion shifted to one end of its movement and the second check valve when the valve portion shifted to the other end.

According to the third feature of the present invention, the first and second check valves are assembled together with the single valve provided for common use, hence contributing to the simplification of the overall arrangement. Also, the first and second check valves are selectively operated with the valve shifted for opening by the action of a pressure difference between two fluid inputs. As a result, no actuator will be needed for driving the valve.

DETAILED DESCRIPTION OF THE PREFERRED EMBODIMENTS

Figure 1:
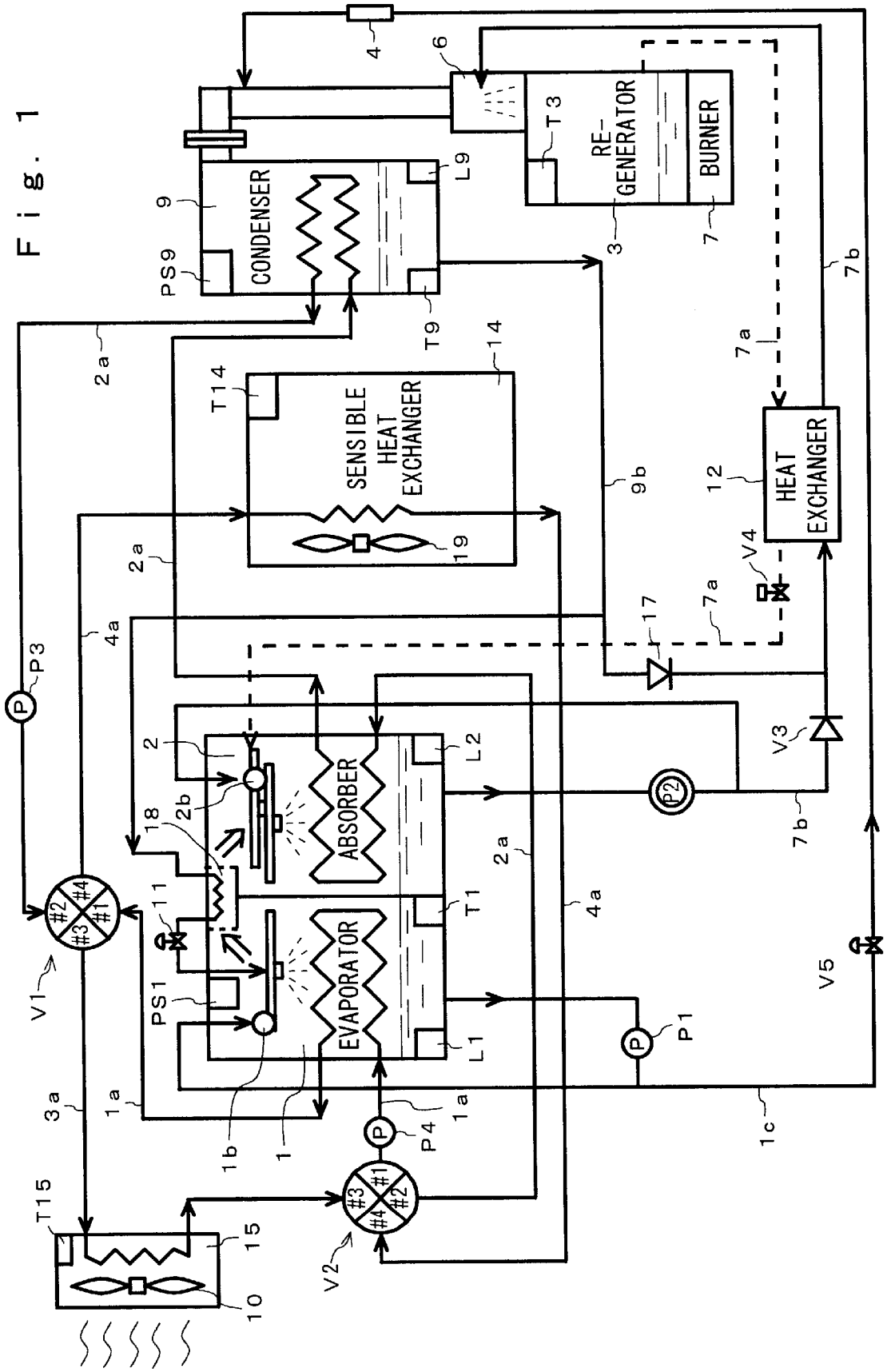
FIG. 1 is a schematic view of a cooling and heating apparatus showing one embodiment of the present invention.

A preferred embodiment of the present invention will be described in more detail referring to the accompanying drawings. FIG. 1 is a block diagram showing a primary part of an absorption cooling and heating apparatus of the embodiment of the present invention. An evaporator 1 accommodates a refrigerant of fluoride alcohol, such as trifluoroethanol (TFE), while an absorber 2 accommodates a solution of DMI derivative, such as dimethyl-imidazolidinon, which contains an absorbent. The refrigerant is not limited to fluoride alcohol but may be an appropriate agent of which the nonfreezing range is wide. The solution is not limited either to the DMI derivative and it may be any other absorbent solution which is wide in the nonfreezing range, being higher than TFE in atmospheric temperature boiling point and having an enough power to absorb TFE.

The evaporator 1 and the absorber 2 are fluidly communicated to each other by a (refrigerant) vapor passage. When the evaporator 1 is kept under a low pressure condition of e.g. 30 mmHg, the refrigerant is vaporized therein and moves via the passage into the absorber 2, as denoted by the double-line arrows. The refrigerant vapor is then absorbed by the absorbent in the absorber 2 thus causing an absorption freezing action.

Absorption refrigerating action is implemented by absorbing the vapor refrigerant with the solution in the absorber 2. A cooler (heat exchanger) 18 is provided in the vapor passage.

When a burner 7 is lit to heat up a regenerator 3 for increasing the concentration of the absorbent solution in the absorber 2, the absorbent absorbs the refrigerant vapor in the absorber 2 and the evaporation of the refrigerant in the evaporator 1 is accelerated hence cooling down the interior of the evaporator 1 with the latent heat of the refrigerant evaporation. The burner, the regenerator, and the concentration of the absorbent solution will be described later in more detail. A tube or pipe 1a for passing a cooled water is mounted to run through the evaporator 1 by using a pump P4. The tube 1a is connected at one end (the exit side in the embodiment shown) to the No. 1 opening of a first four-way valve V1 and at the other end (the entrance side in the embodiment) to the No. 1 opening of a second four-way valve V2. The refrigerant is fed by the action of a pump P1 to a spraying means 1b mounted in the evaporator 1 for being sprayed over the tube 1a in which the cooled water runs. The refrigerant deprives the cooled water in the tube 1a of heat and turns to a refrigerant vapor which passes via the cooler 18 on the vapor passage into the absorber 2. Consequently, the temperature of the cooled water is more declined.

The refrigerant in the evaporator 1 is driven by the pump P1 to the spraying means and, its portion is passed through the filter 4 and transferred to the substantial top portion of the rectifier 6. A flow control valve V5 is provided on a conduit 1c as a bleed line located between the evaporator 1 and the filter 4. The cooled water running in the tube 1a may preferably be either an ethylene glycol or propylene glycol water solution.

As the refrigerant vapor is absorbed by the solution in the absorber 2, the absorption heat increases the temperature of the solution. The lower the temperature and the higher the concentration of the solution, the greater the absorbing capability of the solution will be. For attenuating the temperature increase of the solution, a tube 2a is provided in the absorber 2 for passing a flow of cooling water. The tube 2a is connected at one end (the exit side in the embodiment shown) via a condenser 9 and a pump P3 to the No. 2 opening of the first four-way valve V1 and at the other end (the entrance side) to the No. 2 opening of the second four-way valve V2. Preferably, the cooling water running along the tube 2a is the same as the cooled water which runs across the tube 1a in properties or constitution.

The absorbent solution is fed by the action of the pump P2 to a spraying means 2b mounted in the absorber 2 for being sprayed over the tube 2a. Consequently, the solution is cooled down by the cooling water running along the tube 2a. Simultaneously, the cooling water deprives the solution of heat and its temperature will increase. As the solution in the absorber 2 has absorbed the refrigerant vapor, the concentration of the absorbent drops thus lowering the absorbing capability of the solution.

The diluted solution which has absorbed the refrigerant vapor in the absorber 2 is passed via a tube 7b and a control valve or second check valve V3 to the rectifier 6 and the regenerator 3 by the pump P2. The regenerator 3 is provided with the burner 7 for heating up the diluted solution. The burner 7 may be a gas burner or any other heating means. The solution is heated by the burner 7 and the concentration of the absorbent is increased as the refrigerant vapor is separated. The resultant (concentrated) solution is returned via a tube 7a and a control valve V4 to the absorber 2 where it is sprayed over the tube 2a by the spraying means 2b and pump P2.

The refrigerant vapor generated in the regenerator 3 transferred to the condenser after sufficient separation of a small amount of mixed absorbent solution component from the absorbent solution which is flow down in the rectifier 6 by sufficient contact of the vapor when the vapor flow upward in the rectifier 6. The refrigerant which is cooled and condensed in the condenser 9 is fed back to the evaporator 1 by passing through the conduit 9b via the cooler 18 and depression valve (flow control valve) 11, then is sprayed on the conduit 1a by spray means. The cooler 18 which is a heat exchanger composed on the vapor passage. The cooler 18 accelerate vaporization of the mixed refrigerant mist in the refrigerant vapor generated in the evaporator 1 by heat up the warm refrigerant which is fed back from the condenser. Simultaneously, it depresses the temperature of the refrigerant fed back to the evaporator 1.

The conduit 9b by which the refrigerant is fed back from the condenser 9 to the evaporator 1, is branched into the conduit 9a which is join with the conduit 7b at downstream side of the check valve V3. The branch conduit 9a is provided of a check valve (first check valve) 17 which allows the refrigerant flow into the conduit 7b from the condenser 9. The conduit 9a provides a portion of a circulation pass in which the refrigerant is fed back to the regenerator 3 from the condenser 9 during the direct burner heating operation. An action of the check valve V3 and 17 in every operation modes will be described later.

Although the concentration of the refrigerant circulated from the condenser 9 to the evaporator 1 is very high, it may inevitably be declined with a small amount of the absorbent accumulated therein through long operation cycles in the evaporator 1. In order to increase the concentration of the refrigerant received from the evaporator 3, a portion of the refrigerant from the evaporator 1 is transferred via the filter 4 to the rectifier 6 as described above. The filtering action of the filter 4 inhibits any dirt or rust in the refrigerant from blocking up the conduits in the rectifier 6 and decreasing their function.

In the heat exchanger 12 provided between the two conduits 7a and 7b connecting to the absorber 2 and the rectifier 6 respectively, the high-temperature strong solution received from the conduit 7a of the regenerator 3 is subjected to a heat exchanging action with the weak solution received from the conduit 7 of the absorber and its resultant cooled down solution is transferred and sprayed in the absorber 2. The weak solution heated up preliminary in the heat exchanger 12 is transferred to the rectifier 6. In this manner, the efficiency of heat exchanging can be improved. Moreover, another heat exchanger (not shown) may be provided for transmitting the heat from the strong solution to the cooling water in the conduit 2a connected from the absorber 2 or the condenser 9. As the temperature of the cooling water is increased, the temperature of the strong solution flowed to the absorber 2 will drop down more.

A sensible heat exchanger 14 for exchanging heat of the cooled water or cooling water with the ambient air is linked to a conduit 4a while a room unit 15 is lined to a conduit 3a. The two conduits 3a and 4a (the inlets as illustrated) are connected at one end to the ports #3 and #4 of the first four-way valve V1 respectively and at the other end (the outlets as illustrated) to the ports #3 and #4 of the second four-way valve V2 respectively. The room unit 15 has a fan 10 and its blow outlet (not shown) provided for common use to releasing blows of cooling air and warming air and is located in a room to be cooled or heated. The sensitive heat exchanger 14 is located at the outdoor for forcibly exchanging heat with the ambient air using a fan 19. Also denoted by T1, T3, T9, T14, and T15 are temperature sensors, by L1, L2, and L9 are liquid level sensors, and by PS1 and PS9 are pressure sensors.

For the heat-pump heating operation, the first four-way valve V1 are controlled so as to connect the ports #1 and #4 and, the second four-way valve V2 are controlled so as to connect the ports #2 and #3. This allows the cooling water heated in the absorber 2 and the condenser 9 and received from the conduit 2a to be conveyed by the action of the pump P3 to the conduit 3a in the room unit 15 for heating the room.

During the heat-pump heating operation, the heating capability will be declined when the ambient temperature is extremely low and its heat is hardly taken in. When the ambient temperature is too low, the heat-pump heating operation is switched to the direct-burner heating operation where the refrigerant vapor generated in the regenerator 3 is transferred to and from the condenser 9. As the energy of heat by the burner 7 is efficiently transferred by the action of the condenser 9 to the cooling water running in the conduit 2a in the direct-burner heating operation, the temperature of the cooling water is raised and the heating capability can be increased.

More specifically, when the ambient temperature is low enough to decline the heating capability, both the conduit 9b of the refrigerant from the condenser 9 to the evaporator 1 and the conduit 7a of the strong solution from the regenerator 3 to the absorber 2 are shut up to suspend the heat-pump heating operation. As the heat-pump heating operation has been suspended, the refrigerant condensed in the condenser 9 is returned back to the regenerator 3 via the conduits 9b, 9a, and 7b by the action of check valves 17 and V3 which will be explained later in more detail.

The switching from the heat-pump heating operation to the direct-burner heating operation, i.e. the shut up of the conduits 7a and 9b, may automatically be implemented according to the temperature detected by the temperature sensor T14 provided at an appropriate location at the outdoor (for example, adjacent to the sensitive heat exchanger 14) upon sensing that the ambient temperature drops down to below a predetermined level. Lower ambient temperature below the predetermined level may be determined from whether the load in the heating becomes too high or not. The calculation of the load in the heating operation and the switching to the direct-burner heating operation are depicted in Japanese Patent Laid-open Publications (Heisei) 9-318183 and 10-185344, the applicants, which are quoted as the references in this application.

Figure 2A:
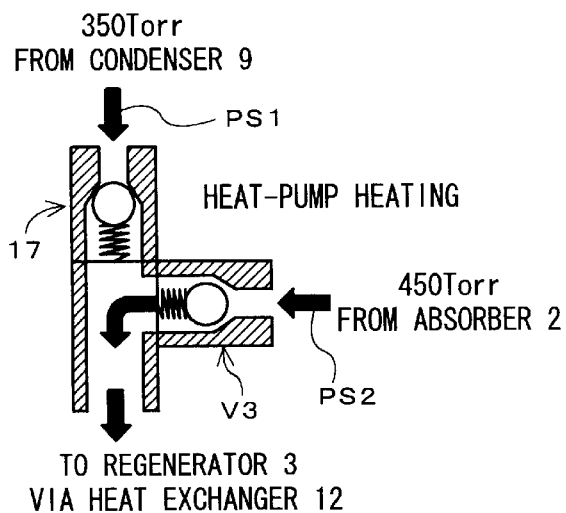
FIGS. 2A and 2B are a cross sectional view of a check valve mounted across a conduit for circulating a refrigerant from a condenser to a regenerator.
Figure 2B:
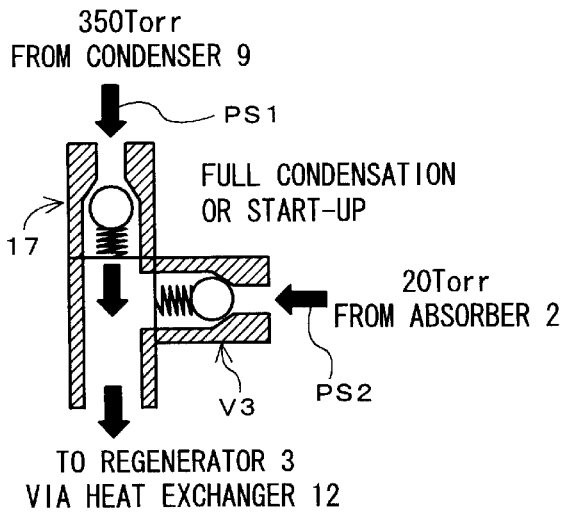

The action of the check valves V3 and 17 in each operation mode will now be explained. FIGS. 2A and 2B are cross sectional views of a three-way valve implemented by a combination of the two check valves V3 and 17. FIG. 2A illustrates the heat-pump heating operation while FIG. 2B illustrates the direct-burner heating operation or full condensation and start-up of the operation. It is assumed that, during the heat-pump heating operation shown in FIG. 2A, the pressure PS1 exerted at the condenser 9 side of the check valve 17 is 350 Torr. Similarly, the pressure PS2 exerted at the absorber 2 side of the check valve V3 is 450 Torr. As the pressure PS2 includes a partial pressure derived from the heat exchanger 12, it is higher than the pressure PS1. This opens the check valve V3 to deliver the weak solution from the absorber 2 to the regenerator 3. Simultaneously, the check valve 17 is closed to cancel the transfer of the refrigerant from the condenser 9 to the regenerator 3.

On the other hand, during the direct-burner heating operation at the full condensation mode or the start-up mode shown in FIG. 2B, the pressure PS2 at the upstream of the check valve V3 is about 20 Torr as is much smaller than the pressure PS1 (about 350 Torr) at the condenser 9 side of the check valve 17. The pressure PS2 is substantially close to the saturated pressure at either the absorber 2 or the evaporator 1. As a result, the check valve V3 is closed to inhibit the flow of the weak solution from the absorber 2 to the regenerator 3. Simultaneously, the check valve 17 is opened to permit the flow of the refrigerant from the condenser 9 to the regenerator 3.

At the start-up operation, the refrigerant from the condenser 9 is delivered via the conduits 9a and 7b to the regenerator 3. When the operation state is transferred to a stable operation state, the conduit 9a is closed to transfer the refrigerant from the condenser 9 to the evaporator 1. Then, when the heat-pump heating operation is transferred to the direct-burner heating operation, the refrigerant is delivered from the condenser 9 via the conduits 9a and 7b to the regenerator 3. More particularly, with no use of any switching actuator, the circulation passes for the refrigerant and the absorbent solution can successfully be developed to implement each of the operation modes as the branch conduit 9a has automatically been switched by the effect of a difference in the pressure between the condenser 9 side and the absorber 2 side.

Figure 3A:
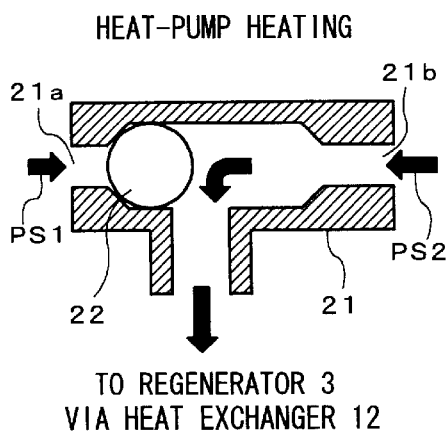
FIGS. 3A and 3B are a cross sectional view showing a modification of the check valve.
Figure 3B:
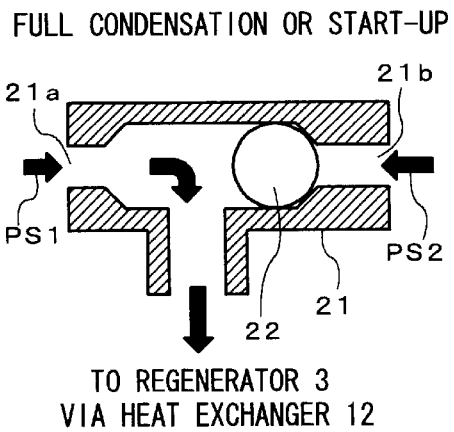

The switching between the conduits for the refrigerant is not limited to the action of the integrally provided check valves V3 and 17 having valves as the moving parts shown in FIGS. 2A and 2B. FIGS. 3A and 3B are cross sectional view of a modifications having a single moving part or valve provided for switching between the conduits. FIG. 3A illustrates the heat-pump heating operation while FIG. 3B illustrates the direct-burner heating operation which runs at the full condensation mode or the start-up mode. A valve assembly 21 has a free ball 22 provided therein as the valve (the moving part) for free movement in the valve assembly 21. When the ball 22 is shifted to the left as shown in FIG. 3A, it shuts up the port 21a connected to the condenser 9 and simultaneously opens the port 21b connected to the absorber 2. When the ball 22 is shifted to the right as shown in FIG. 3B, it shuts up the port 21b connected to the absorber 2 and opens the port 21a connected to the condenser 9.

As described with FIGS. 3A and 3B, the pressure PS2 at the absorber 2 side is higher than the pressure PS1 at the condenser 9 side in the heat-pump heating operation thus shifting the ball 22 to shut up the port 21a. This movement allows the weak solution to flow from the absorber 2 into the regenerator 3 and inhibits the refrigerant from receiving via the branch conduit 9a from the condenser 9. When the direct-burner heating operation or the start-up operation is initiated, the pressure PS2 at the absorber 2 side becomes lower than the pressure PS1 at the condenser 9 side thus shifting the ball 22 to shut up the port 21b. This inhibits the weak solution from receiving from the absorber 2 and allows the refrigerant to flow from the condenser 9 via the branch conduit 9a into the regenerator 3.

As defined in claims 1 to 3, the second check valve is closed to inhibit the flow of the solution from the absorber to the regenerator when the start-up operation or the directly-burner heating operation is initiated, i.e. the pressure is lower at the absorber side than at the condenser side. When the heat-pump heating operation is initiated, i.e. the pressure is higher at the absorber side than at the condenser side, the first check valve is closed to inhibit the flow of the refrigerant from the condenser to the regenerator.

Particularly, as defined in claim 3, the valve is shifted by the action of a pressure difference in the system thus to switch the flow from one conduit to another. Accordingly, the overall arrangement can be simplified with the use of no valve actuator.

Also, as the refrigerant is conveyed from the condenser to the regenerator by the action of the switching means but not over-flown from the condenser, the following advantage is gained. Since the solution to be processed is greater in the amount than the rectifying step in the direct-burner heating operation, its over-flow will increase. If the size of the rectifier is determined in view of the over-flow, it may hardly conform to the requirement of the rectifying action. The present invention allows the rectifier to be sized in view of only optimization of its rectifying function.

As the refrigerator needs not to stay in the condenser until it over-flows, its overall amount in the system can be minimized and the condenser can be downsized. It is also unnecessary to support the energy until the over-flow starts.

What is claimed is:

1. An absorption type cooling and heating apparatus having an evaporator for holding a refrigerant, an absorber for allowing an absorbent solution to absorb a refrigerant vapor generated in the evaporator, a regenerator for recovering the density of an absorbent in the absorbent solution by heating up to extract the refrigerant vapor from the absorbent solution, a refrigerant vapor passage for transferring the refrigerant vapor from the regenerator to a condenser, and the condenser for condensing the refrigerant vapor which is returned back to the evaporator, where in a cooling operation, a heat-pump heating operation, and a direct-burner heating operation can be performed selectively, said absorption type cooling and heating apparatus comprising:

a first conduit for transferring the condensed refrigerant generated in the condenser to the evaporator;

a second conduit for transferring the absorbent solution from the absorber to the regenerator;

a branch conduit branched from the first conduit; and a switching device for selectively communicating the branch conduit to the second conduit.

2. An absorption type cooling and heating apparatus according to claim 1, wherein the switching device is a first check valve for allowing the flow from the condenser via the branch conduit to the regenerator while a second check valve is also provided for allowing the flow from the absorber to the regenerator, the first and second check valve communicated with each other at the downstream side.

3. An absorption type cooling and heating apparatus according to claim 2, wherein the first and second check valves are assembled in a single unit having a movable valve portion provided at the downstream junction thereof so that the valve portion can be shifted to each end of its movement by a pressure difference between two fluids introduced into the input ports of the first and second check valves, thus the first check valve is shut up when the valve portion shifted to one end of its movement and the second check valve when the valve portion shifted to the other end.

* * * * *